Figure 1:
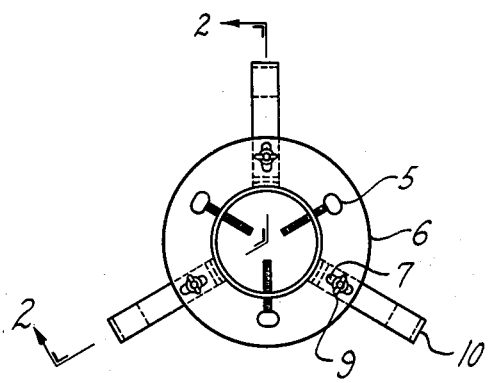

March 10, 1953     J. H. DICOSKEY     2,630,994

CHRISTMAS TREE HOLDER

Filed May 11, 1949

INVENTOR.
John H. Dicoskey
BY William B. Jaspert
Attorney.

Patented Mar. 10, 1953

2,630,994

UNITED STATES PATENT OFFICE 2,630,994

CHRISTMAS TREE HOLDER

John H. Dicoskey, Pittsburgh, Pa.

Application May 11, 1949, Serial No. 92,557

1 Claim. (Cl. 248—44)

This invention relates to new and useful improvements in Christmas tree holders, and it is among the objects thereof to provide a Christmas tree holder which shall be adjustable to the size of the tree trunk and adjustable to fit ordinary water buckets as a base or mounting.

Figure 2:
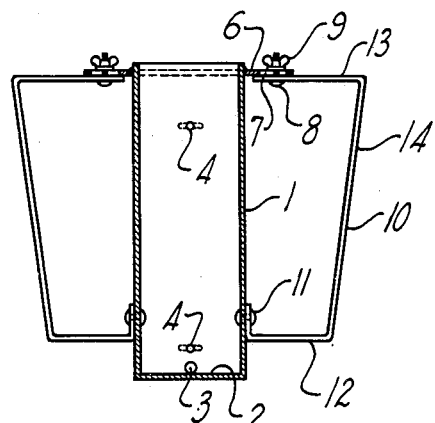
Figure 3:
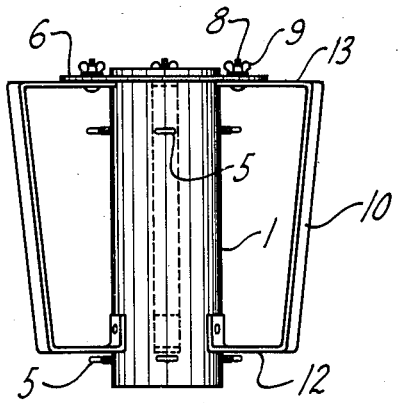

The invention has other novel features which will become apparent from a consideration of the accompanying drawing, constituting a part hereof, in which like reference characters designate like parts, and in which:

Fig. 1 is a top plan view of a Christmas tree holder embodying the principles of this invention;

Fig. 2 a vertical cross sectional view taken along the line 2—2, Fig. 1;

Fig. 3 a side elevational view of the Christmas tree holder; and

Figure 4:
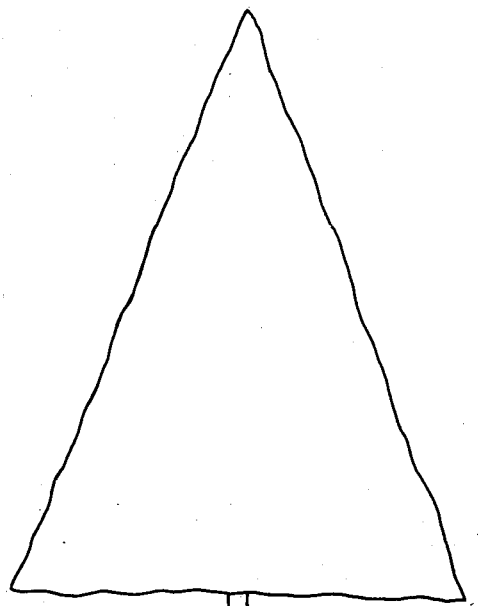

Fig. 4 a side elevational view diagrammatically illustrating the tree holder as an adapter for mounting in a water bucket.

With reference to the several figures of the drawing, numeral 1 designates a piece of tubing having an end wall 2 and which is provided with a weep hole 3. The wall of the tube is provided with threaded openings 4 for receiving wing screws 5 as is more clearly shown in Fig. 1, there being two groups of three screws vertically spaced as shown in Fig. 2.

A radial flange 6 is provided at the top of the tube 1, being secured thereto by welding or in any other suitable manner, the flange being provided with slotted openings 7 for receiving bolts 8 having wing nuts 9. Riveted or otherwise secured adjacent the base of the tube 1 are angle brackets 10 riveted to the tube as shown at 11, the angle brackets having parallel ends 12 and 13 and an inclined connecting member 14, the end 13 being perforated to receive the bolts 8.

The tree is mounted in the tubular casing 1 by the clamping screws 5, it being assumed that the trunk of the tree is smaller than the inner diameter of the casing 1, the screws 5 being adjusted to approximately center the tree. The straps 10 are then adjusted in their radial dimension by the wing nuts 9 to exactly fit the inner wall of a bucket 15, shown in Fig. 4, to be firmly secured therein. The bucket acts as a base for the tree to give it substantial support, and it is filled with water to weight it and also water the tree through the weep hole 3, Fig. 2 of the drawing.

It is evident from the foregoing description of the drawing that a Christmas tree holder made in accordance therewith provides a simple and convenient attaching means for a Christmas tree that is adapted to fit the conventional form of water bucket, whereby when the bucket is filled, sufficient weight and base is available to firmly hold the tree against tipping.

Although one embodiment of the invention has been herein illustrated and described, it will be evident to those skilled in the art that various modifications may be made in the details of construction without departing from the principles herein set forth.

I claim:

A Christmas tree holder comprising a tubular socket member having clamping screws extending through the walls thereof for clamping a tree therein, said socket member having outriggers in the shape of adjustable strap members having portions inclined to conform with the inner tapered wall of a bucket for engagement with the inner wall of the bucket, means for securing the strap members to the socket member at one end thereof, and means for adjustably securing said strap members to the socket at the other end of said socket.

JOHN H. DICOSKEY.

REFERENCES CITED

The following references are of record in the file of this patent:

UNITED STATES PATENTS

| Number | Name | Date |
| --- | --- | --- |
| 1,124,780 | Miller et al. | Jan. 12, 1915 |
| 1,160,698 | Diederichs | Nov. 16, 1915 |
| 1,408,757 | Metzger | Mar. 7, 1922 |
| 1,569,793 | Tomhave | Jan. 12, 1926 |
| 2,532,931 | Miller | Dec. 5, 1950 |